United States Patent [19]

Hummel

[11] 4,236,906
[45] Dec. 2, 1980

[54] REDUCING TIN DRIP WITH SULFUR CONTAINING GAS

[75] Inventor: Merritt J. Hummel, New Kensington, Pa.

[73] Assignee: PPG Industries, Inc., Pittsburgh, Pa.

[21] Appl. No.: 62,831

[22] Filed: Aug. 1, 1979

[51] Int. Cl.³ .............................................. C03B 18/20
[52] U.S. Cl. ........................................ 65/27; 65/99 A
[58] Field of Search ....................... 65/27, 182 R, 99 A

[56] References Cited

U.S. PATENT DOCUMENTS

| | | | |
|---|---|---|---|
| 3,337,319 | 8/1967 | Edwards | 65/27 |
| 3,494,755 | 2/1970 | Montgomery | 65/27 |
| 3,549,343 | 12/1970 | Loukes et al. | 65/30 |
| 3,597,178 | 8/1971 | Tilton | 65/27 |
| 3,811,854 | 5/1974 | Pecoraro | 65/27 |
| 4,019,885 | 4/1977 | Snow | 65/32 |

FOREIGN PATENT DOCUMENTS

| | | | |
|---|---|---|---|
| 1528986 | 6/1968 | France | 65/99 A |
| 1282866 | 7/1972 | United Kingdom | 65/99 A |

*Primary Examiner*—Arthur D. Kellogg
*Attorney, Agent, or Firm*—Dennis G. Millman; Paul A. Leipold

[57] ABSTRACT

A method of reducing tin drip by introduction of a sulfur gas into the forming chamber is disclosed. The sulfur containing gas reacts with the elemental tin present in the chamber superstructure and forms compounds such as tin sulfide which will sublime upon heating and that are unlikely to drip from the ceiling.

9 Claims, 2 Drawing Figures

REDUCING TIN DRIP WITH SULFUR CONTAINING GAS

BACKGROUND OF THE INVENTION

1. Field of the Invention

The field of the invention relates to the manufacture of float glass and more particularly to a method for preventing defects resulting from metal dripping from the ceiling of the forming chamber above the metal bath within the forming chamber onto the glass ribbon passing through the chamber.

2. Prior Art

The manufacture of flat glass by the float process involves delivering glass at a controlled rate onto a relatively wide bath of molten metal (normally tin) and advancing it along the bath surface of molten metal under conditions which assure that a sheet of glass of a desired thickness and optical property may be withdrawn at the exit end of the forming chamber. Above the bath of molten metal, the forming chamber holding the molten metal has a head space containing an inert to reducing atmosphere, a refractory ceiling extends over the headspace and above the ceiling is a plenum or service space for introduction of a forming or nitrogen gas which enters the headspace through the ceiling and prevents deterioration of the metal bath. The plenum also contains the electrical connections for the candle heating elements utilized in the bath.

The forming gas is normally nitrogen with some small percentage of hydrogen. The purpose of the forming or nitrogen gas is to prevent the oxidation of the tin. The forming chamber is tightly closed and a positive pressure of the forming or nitrogen gas is maintained in the forming chamber to prevent the ingress of air containing oxygen. While the conventional practice has resulted in production of fine quality glass there remains a continuing difficulty with a defect known as "tin drip" which results from droplets of molten tin which are on the upper surface of the glass when it is removed from the forming chamber. These tin drips are the result of dripping from the ceiling of the forming chamber. The occurrence of tin drip is a chronic problem in the operation of the forming chamber, but is of particular difficulty when a temperature change is required in the forming chamber. The heating of the roof candles results in affecting the viscosity, surface tension and chemical reactivity of tin droplets on and near the candles leading to their agglomeration and falling from the roof onto the glass. It would be desirable to minimize the formation of elemental tin droplets on the candle and roof structure of the forming chamber.

In U.S Pat. No. 4,019,885 to Snow it is suggested that the problem of tin drip be reduced by utilization of a halogen or halide fluxing agent which when utilized at infrequent intervals would cause the molten metal deposits on the roof to coalesce and drop onto the glass ribbon or molten metal bath at controlled occasions.

In U.S. Pat. No. 3,597,178 to Tilton and in U.S. Pat. No. 3,494,755 to Montgomery, it is suggested that the tin be condensed in a controlled manner onto a structure within the forming chamber in order to control it in a manner in which it does not drip onto the glass ribbon but rather onto the tin. In Montgomery a curved support overhangs the glass ribbon in such a manner that the tin droplets drip off the edge of the support in an area beyond that covered by the glass ribbon. In Tilton a wire mesh material is passed through the forming chamber where it collects volatiles for removal to an area outside the bath where the screen is cleaned.

It is also known to use lances to try and blow tin and other deposits from the roof of the forming chamber.

There remains a need for a method of minimizing roof contamination and tin drip in the forming chamber without the addition of expensive and complicated apparatus to the chamber and without introducing gases or other chemicals which bring a new material into the forming chamber environment that may contaminate the glass or shorten the life of refractories within the bath. Further, it is important that any material utilized to reduce tin drip does not contaminate the molten metal bath or the glass. A control method not involving process interruptions is also desirable.

SUMMARY OF THE INVENTION

It is an object of this invention to overcome problems of the prior art.

It is another object of this invention to form glass of better quality.

It is another further object of the invention to eliminate tin drip without interfering with glass production.

It is an additional object of this invention to reduce the need for cleaning of the inside of forming chamber roofs.

It is a further object of this invention to reduce tin drip on glass following the increased heating of roof candles.

It is another object of this invention to reduce tin drip defects in float glass.

These and other objects of the invention are generally accomplished by introduction of a sulfur containing gas into the upper plenum of the forming chamber. The sulfur containing gas reacts with the elemental tin present in the ceiling and forms compounds such as tin sulfide which will sublime upon heating and thereby lower the amount of elemental tin which could drip from the ceiling.

In a particularly preferred embodiment of the invention hydrogen sulfide is added to the plenum of the forming chamber with the forming or nitrogen gas. From the plenum the hydrogen sulfide seeps into the forming chamber around the holes where the candles pass from the plenum to the forming chamber. As hydrogen sulfide enters the forming chamber with the forming or nitrogen gas it reacts and converts elemental tin on the candles or on the refractories of the roof structure to tin sulfide. The tin sulfide will sublime when heated rather than dripping as liquid onto the glass.

DETAILED DESCRIPTION OF THE INVENTION

This invention results in numerous advantages over prior art processes. The minimization of tin drip results in advantages to glass quality and efficiency of the glass making process as less glass must be discarded. Further, shutdowns are avoided because at present a periodic shutdown or blowdown is generally utilized to clean the roof of the forming chamber. Such cleaning is made necessary only at more widely spaced intervals by the utilization of the instant invention. Utilization of the instant invention also allows changeover from one glass thickness to another or from one tonage rate to another without undue tin drip being caused by the change in the heating pattern of the candles. Ordinarily, in a product changeover more or different candles will be activated. The tin on the candles newly activated may coalesce and drop onto the glass. This effect is eliminated or minimized by the instant invention.

Figure 1:
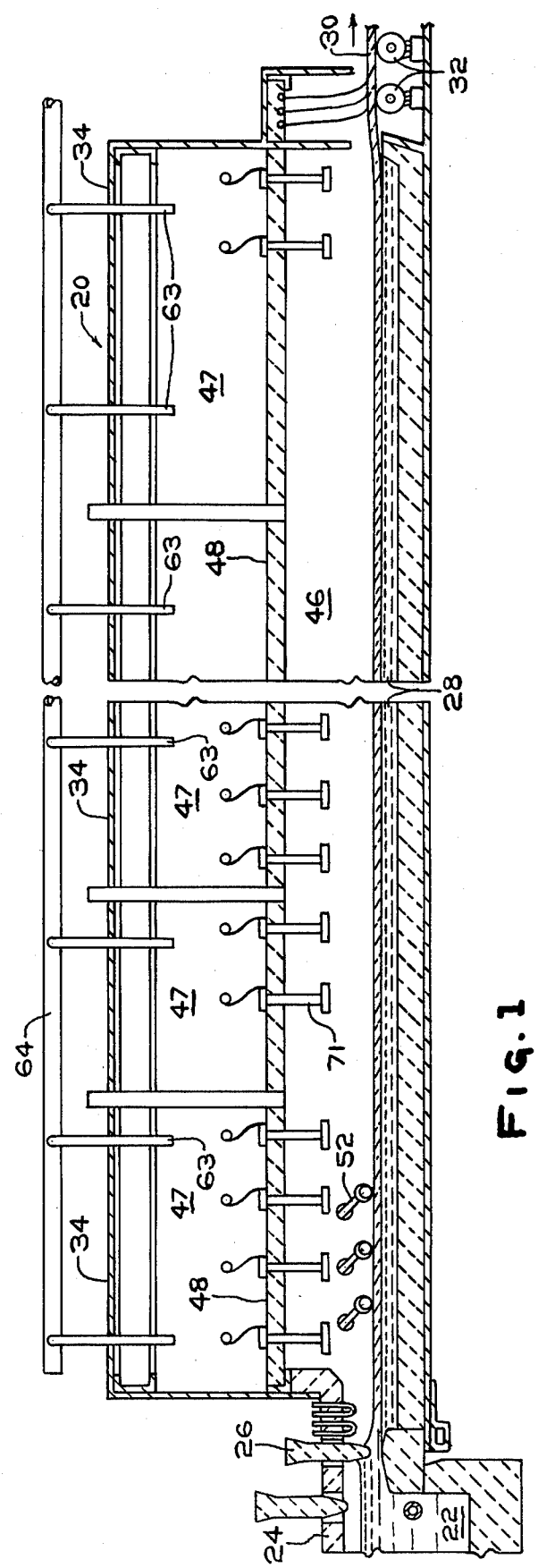
FIG. 1 is a side elevated view of a forming chamber suitable for the use with the invention.
Figure 2:
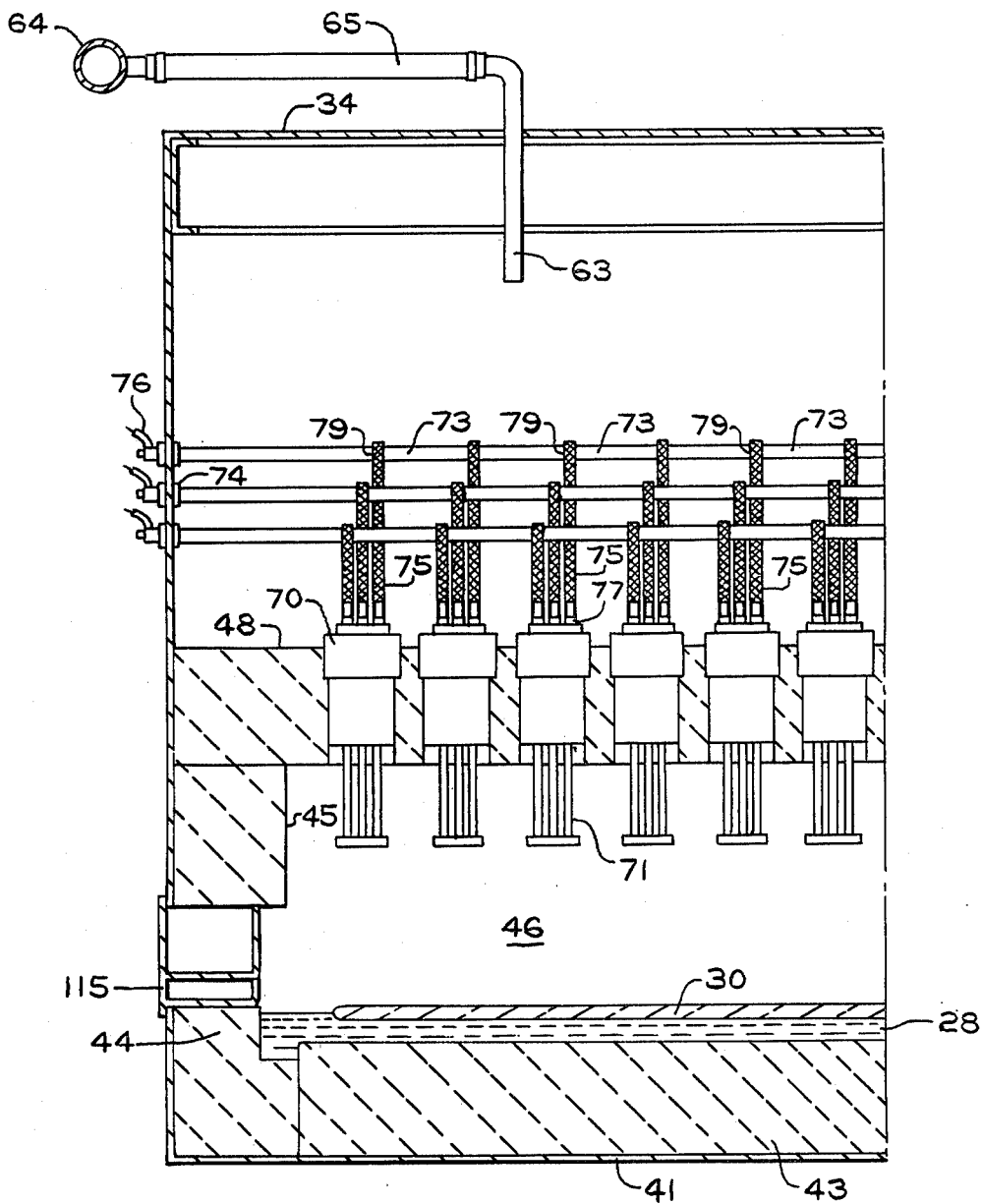
FIG. 2 is a partial sectional plan view of the forming chamber of FIG. 1 showing the heaters.

With reference to FIG. 1, there is shown a conventional forming chamber 20 of the type taught in U.S. Pat. No. 3,976,460, which teachings are hereby incorporated by reference. In general, glass making ingredients are fed into and melted in a melter (not shown) to make molten glass 22. The molten glass flows downstream into a refiner 24 where the molten glass is fined and conditioned. Thereafter, the molten glass is controllably flowed past tweel 26 into a pool of molten metal 28 contained in the glass forming chamber 20. As the molten glass flows on the molten tin it is selectively and controllably cooled and sized to a dimensionally stable glass ribbon 30. The thickness of the ribbon is controlled by edge control machines illustrated as 52 which provide force to the glass to form it into a thickness either greater or less than equilibrium thickness. The head space 46 of the forming chamber is separated from the service area or plenum by the ceiling 48 of the forming chamber. Steel plate 34 forms the upper ceiling and sides of the plenum area. Forming gas or nitrogen gas enters the plenum from pipe 63 extending through the roof plate. The pipe 63 is connected to forming gas manifold distribution pipe 64 by connecting gas line 65. The manifold 64 is connected to a source (not shown) of forming gases.

The candles 71 are utilized to heat various portions of the glass passing through the forming chamber in order to control the cooling profile of the glass. The candles 71 are quite numerous there being at least several hundred in the forming chamber. The candles 71 conventionally having three heater elements, rest on a ceramic members 70. They are supported by the ceiling 48 and are connected to bus bar 73 which extends through electrically insulated collar 4 mounted in the upper casing 34 and are connected to a source of electric power (not shown). The heaters 71 are connected to the bus bar 73 by connecting straps 75 and electric power is provided to the bus bars by a power cable 76. The connecting straps 75 are connected to the heaters and the bus bars respectively by conducters 77 and 79. The ceramic pieces 70 support the candle members which are loosely resting on them. The collars allow ingress of forming gas from the plenum area 47 into the head space of the forming chamber 46. As the forming or nitrogen gas circulates in the head space 46, some of the gases invariably leak back towards the plenum area 47. Such gases, as they cool, deposit contaminants from the forming chamber onto the candles 71 and the collars 70. The forming chamber atmosphere contaminants also deposit onto the roof 48. When the candles are increased in power or turned on any tin which is deposited on the roof or candles tends to grow and coalesce and drip onto the glass.

While the chemistry of the bath ceiling contamination is not completely understood, it is believed that the primary source of tin on the roof is the evaporation of tin sulfide from the tin bath. It may be possible that some contamination is direct vapor deposition of the tin from the bath which condenses onto the roof. However, it is believed that the primary source is tin sulfur compounds primarily tin sulfide evaporating directly from the bath. The sulfur enters the bath from the glass ribbon as it passes over the bath in the forming chamber. The tin sulfide after depositing onto the roof and candles, particularly inside the collar pieces surrounding the candles is reduced by the hydrogen gas present in the forming gas to form elemental tin. It is also believed possible that some of the tin sulfide (SnS) can be converted to elemental tin by the disproportionation of tin sulfide into tin and tin disulfide ($SnS_2$): symbolically 2 $SnS \rightarrow Sn + SnS_2$. Tin sulfide condenses at less than about 800° F. (about 425° C.). At higher temperatures the tin sulfides will sublime at a much greater rate than elemental tin. Therefore, when the candles are increased in heat, the tin sulfide formed by the instant invention is likely to sublime while elemental tin will drip.

In accordance with the invention, hydrogen sulfide is added in very small quantities into the forming or nitrogen gas in the plenum. A concentration of 10 to about 30 parts per million hydrogen sulfide gas in the forming or nitrogen gas is preferred. The sulfur containing gas may be fed into the plenum 47 either as a separate stream or mixed with the forming or nitrogen gases. The hydrogen sulfide gas reacts with the elemental tin to form tin sulfide which is likely to sublime harmlessly when heated rather than dripping onto the glass as will tin.

While described above with respect to the utilization of hydrogen sulfide, it is possible within the invention to use any sulfur containing gas which will react with tin. Among typical sulfur containing gases are sulfur gas and carbon sulfide. Hydrogen sulfide is preferred because it is a natural ingredient in the bath and does not introduce additional contaminants not already present in the atmosphere. A low concentration of hydrogen sulfide may be utilized effectively as it is continuously available and passes through the openings for the candles where a large portion of the tin which causes tin drip is concentrated.

As will be apparent to those skilled in the art, the present system may be modified and equivalent elements or processes may be employed in combination therewith without departing from the spirit of this invention For instance, while the hydrogen sulfide or other sulfur containing gas is described as entering from the plenum into the forming chamber it also is within the invention to directly introduce the hydrogen sulfide into the forming chamber where the natural or forced convection would bring it into contact with the elemental tin on the ceiling. In another variation consistent with the invention, the forming gas of nitrogen with a small amount of hydrogen could be added directly into the forming chamber with all the hydrogen sulfide being introduced with nitrogen into the plenum above the head space of the forming chamber. It is also within the invention to utilize the sulfur containing gas only for a period sufficient to convert tin, condensate the tin sulfide and return to using forming gas or nitrogen for a period until tin condensate is again a problem. Further, the invention is suitable for use in a forming chamber where glass is formed either from the process where molten glass enters the forming chamber by free fall over a lip or the process as illustrated in FIG. 1, wherein the glass enters the forming chamber in a gentle sloping path from the furnace.

While the present invention has been described with reference to certain specific embodiments thereof, it is not intended to be so limited. Rather, the invention is set forth in the accompanying claims.

I claim:

1. A method for reducing tin drip in a glass forming process in which the glass passes through a forming chamber containing a bath of tin comprising contacting tin on said chamber roof with a gas containing sulfur in order to convert said tin to a tin-sulfur compound by reaction with said gas containing sulfur.

2. The method of claim 1, wherein said gas comprises hydrogen sulfide.

3. The method of claim 1, wherein said gas enters said forming chamber through the plenum above said chamber.

4. The method of claim 1 further comprising vaporizing said tin-sulfur compound.

5. The method claim 1 or 3, wherein said sulfur containing gas is introduced with forming gas or nitrogen gas.

6. The method of claim 1, wherein said tin-sulfur compound comprises tin sulfide.

7. The method of claim 1, wherein said gas containing sulfur is continuously introduced during said glass forming.

8. The method of claim 1, wherein after conversion of substantially all tin on the roof to tin-sulfur compound, the glass forming process is operated without addition of sulfur containing gas for a period.

9. The method of claim 8, wherein said period is until tin returns as a glass defect.

* * * * *